United States Patent
Cheng et al.

(10) Patent No.: US 9,338,672 B2
(45) Date of Patent: May 10, 2016

(54) SYSTEM AND METHOD FOR COORDINATING HUB-BEAM SELECTION IN FIXED WIRELESS BACKHAUL NETWORKS

(71) Applicant: BLiNQ Wireless Inc., Ottawa (CA)

(72) Inventors: Ho Ting Cheng, Stittsville (CA); Akram Bin Sediq, Ottawa (CA); Radu Bogdan Selea, Vaughan (CA); Xiaochang Wu, Nepean (CA); Taiwen Tang, Ottawa (CA); Terasan Niyomsataya, Ottawa (CA); Sorin Alexandru Michnea, Nepean (CA)

(73) Assignee: BLiNQ Wireless Inc., Ottawa, Ontario (*) Notice: Subject to any disclaimer, the term of this patent is extended or adjusted under 35 U.S.C. 154(b) by 77 days.

(21) Appl. No.: 14/255,068

(22) Filed: Apr. 17, 2014

(65) Prior Publication Data
US 2015/0305047 A1    Oct. 22, 2015

(51) Int. Cl.
*H04W 24/00* (2009.01)
*H04W 72/04* (2009.01)
*H04W 24/02* (2009.01)
*H04W 72/08* (2009.01)
(Continued)

(52) U.S. Cl.
CPC ............ *H04W 24/02* (2013.01); *H04W 72/085* (2013.01); *H04B 17/005* (2013.01); *H04B 17/0077* (2013.01); *H04W 72/046* (2013.01); *H04W 88/04* (2013.01)

(58) Field of Classification Search
CPC ..... H04W 24/00; H04W 72/04; H04W 80/04; H04W 36/30; H04W 88/04
See application file for complete search history.

(56) References Cited

U.S. PATENT DOCUMENTS

| | | | |
|---|---|---|---|
| 5,956,642 | A | 9/1999 | Larsson et al. |
| 7,729,257 | B2 | 6/2010 | Kodialam et al. |

(Continued)

FOREIGN PATENT DOCUMENTS

| | | |
|---|---|---|
| CA | 2809721 A1 | 3/2012 |
| WO | 96/31009 A1 | 10/1996 |

(Continued)

OTHER PUBLICATIONS

S. G. Kiani and D. Gesbert, entitled "Optimal and Distributed Scheduling of Multicell Capacity Maximization" IEEE Trans. Wireless Commun., vol. 7, No. 1, pp. 288-297, Jan. 2008.
(Continued)

*Primary Examiner* — Andrew Lee
(74) *Attorney, Agent, or Firm* — Ridout & Maybee LLP

(57) ABSTRACT

Systems and methods are disclosed for coordinating hub-beam selection in wireless backhaul networks and optionally, for joint hub-beam selection and slot assignment. Data indicative of path loss is measured or estimated for each of a set of RBMs and for each hub-beam of a respective multi-beam serving hub. A performance metric is computed, and hub-beam selection is made based on optimizing the performance metric across the set of RBMs. A serving hub may use reserved frames to train an RBM on each hub-beam and communicate beam selections, e.g. based on minimizing path loss on a per-cell or per-sector basis, or maximizing a sum-utility function for improved performance over a neighborhood of the network. A beam assignment map may be shared amongst serving hubs. A weight table of good and bad beam combinations may be generated to evaluate the cost of a hub-beam combination, for joint hub-beam selection and slot assignment.

18 Claims, 10 Drawing Sheets

(51) Int. Cl.
*H04B 17/00* (2015.01)
*H04W 88/04* (2009.01)

(56) References Cited

U.S. PATENT DOCUMENTS

| | | | |
|---|---|---|---|
| 7,826,417 | B2 | 11/2010 | Yang et al. |
| 2002/0063656 | A1* | 5/2002 | Gutowski .............. H04W 24/00 342/360 |
| 2004/0087327 | A1 | 5/2004 | Guo |
| 2007/0140177 | A1* | 6/2007 | Li .......................... H01Q 1/246 370/335 |
| 2008/0032734 | A1* | 2/2008 | Au ......................... H04W 28/22 455/522 |
| 2008/0090580 | A1* | 4/2008 | Sung ..................... H04W 16/02 455/450 |
| 2008/0298445 | A1* | 12/2008 | Richardson .......... H04B 7/0491 375/224 |
| 2009/0197603 | A1 | 8/2009 | Ji et al. |
| 2010/0003993 | A1* | 1/2010 | Engstrom ............. H04W 16/18 455/446 |
| 2010/0009748 | A1 | 1/2010 | Timperley |
| 2010/0087149 | A1 | 4/2010 | Srinivasan et al. |
| 2010/0097948 | A1 | 4/2010 | Barberis |
| 2010/0150267 | A1* | 6/2010 | Zangi ................ H04L 25/03343 375/296 |
| 2010/0159841 | A1 | 6/2010 | Barberis et al. |
| 2011/0059735 | A1* | 3/2011 | Thiel ..................... H04W 16/18 455/423 |
| 2011/0222455 | A1 | 9/2011 | Hou et al. |
| 2012/0052828 | A1* | 3/2012 | Kamel ................. H04B 7/0408 455/226.2 |
| 2012/0133557 | A1 | 5/2012 | Beaudin |
| 2012/0140642 | A1 | 6/2012 | Beck et al. |
| 2012/0213113 | A1* | 8/2012 | Zhao ..................... H04B 7/0626 370/252 |
| 2012/0236731 | A1 | 9/2012 | Beaudin |
| 2012/0281648 | A1 | 11/2012 | Dahrouj et al. |
| 2012/0307745 | A1* | 12/2012 | Panchal ............... H04W 52/242 370/329 |

FOREIGN PATENT DOCUMENTS

| | | |
|---|---|---|
| WO | 2005/101882 A1 | 10/2005 |
| WO | 2008/033369 A2 | 3/2008 |
| WO | 2008/096383 A1 | 8/2008 |
| WO | 2009/066986 A2 | 5/2009 |
| WO | 2009/119463 A2 | 10/2009 |
| WO | 2010/003509 A1 | 1/2010 |
| WO | 2010/013245 A1 | 2/2010 |
| WO | 2011/037319 A1 | 3/2011 |
| WO | 2012/037643 A1 | 6/2012 |
| WO | 2013/000068 A1 | 1/2013 |

OTHER PUBLICATIONS

L. Venturino, N. Prasad, and X. Wang, entitled "Coordinated Scheduling and Power Allocation in Downlink Multicell OFDMA Networks," IEEE Trans. Veh. Technol., vol. 6, No. 58, pp. 2835-2846, Jul. 2009.

A. L. Stolyar and H. Viswanathan, entitled "Self-Organization Dynamic Fractional Frequency Reuse for Best-Effort Traffic Through Distributed Intercell Coordination," in INFOCOM, Apr. 2009.

M. X. Gong, et al., "Load- and Interference-Aware Channel Assignment for Dual-Radio Mesh Backhauls", 2006 IEEE Global Telecommunications Conference (IEEE GLOBECOM 2008), pp. 1-6, Nov. 30-Dec. 4, 2006.

* cited by examiner

| RBM ID | PL OF SERVING HUB BEAM 1 | PL OF SERVING HUB BEAM 2 | ... | PL OF SERVING HUB BEAM S |
|---|---|---|---|---|
| 1 | 100dB | 127dB | ... | 89dB |
| 2 | 70dB | 90dB | ... | 105dB |
| 3 | 120dB | 80dB | ... | 85dB |

FIG. 8

"GOOD" BEAM COMBINATIONS

| COMB.# | 1 | 2 | 3 |
|---|---|---|---|
| WEIGHT | -0.1 | -0.1 | -0.1 |
| SECTOR 1 | L | R | C |
| SECTOR 2 | L | R | C |
| SECTOR 3 | L | R | C |

FIG. 9A

"BAD" BEAM COMBINATIONS

| COMB.# | 1 | 2 | 3 | 4 | 5 | 6 | 7 | 8 | 9 |
|---|---|---|---|---|---|---|---|---|---|
| WEIGHT | 1 | 1 | 1 | 0.2 | 0.2 | 0.2 | 0.2 | 0.2 | 0.2 |
| SECTOR 1 | L | X | R | L | C | X | X | R | C |
| SECTOR 2 | R | L | X | C | R | L | C | X | X |
| SECTOR 3 | X | R | L | X | X | C | R | C | L |

X = ANY BEAM

FIG. 9B

SLOT ASSIGNMENT BEFORE SHUFFLING

| TIME-SLOTS | t1 | t2 | t3 | t4 |
|---|---|---|---|---|
| SECTOR 1 | L | C | R | C |
| SECTOR 2 | R | L | C | C |
| SECTOR 3 | C | R | L | C |

FIG. 10A

SLOT ASSIGNMENT AFTER SHUFFLING

| TIME-SLOTS | t1 | t2 | t3 | t4 |
|---|---|---|---|---|
| SECTOR 1 | L | C | R | C |
| SECTOR 2 | L | C | R | C |
| SECTOR 3 | L | C | R | C |

FIG. 10B

SYSTEM AND METHOD FOR COORDINATING HUB-BEAM SELECTION IN FIXED WIRELESS BACKHAUL NETWORKS

CROSS-REFERENCE TO RELATED APPLICATIONS

This application is related to International Patent Application No. PCT/CA2011/001020 and to U.S. patent application Ser. No. 13/230,368, both of which were filed Sep. 12, 2011, entitled "System and Method for Co-Channel Interference Measurement And Managed Adaptive Resource Allocation for Wireless Backhaul", claiming priority from U.S. Provisional Patent Application No. 61/382,217, filed Sep. 13, 2010; this application is also related to U.S. patent application Ser. No. 14/129,150, entitled "Method and Apparatus for Determining Network Clusters for Wireless Backhaul Networks", filed Jun. 29, 2012, claiming priority from U.S. Provisional Patent Application No. 61/503,336, filed Jun. 30, 2011; all these applications are incorporated herein by reference in their entirety.

TECHNICAL FIELD

The present invention relates generally to fixed wireless backhaul networks and is particularly related to a system and method for hub-beam selection in wireless backhaul networks.

BACKGROUND

Wireless backhaul networks are deployed to carry the traffic between a wireless access network and the core network. For example, as described in the above referenced related patent applications, a wireless backhaul network may comprise a plurality of hubs, each connected to the wired core network, via Ethernet. Each hub serves multiple Remote Backhaul Modules (RBMs), in a point-to-multipoint or point-to-point configuration, using a wireless channel Each RBM is deployed close to an access network base station, such as a small cell base station, and connected to the base station via a cable. The hubs are deployed at the locations where wired high capacity access to the core network is available, e.g. at a fiber point-of-presence.

In a wireless backhaul network, the term cluster refers to a number of RBMs and their respective serving hub. The performance of an RBM, e.g. such as throughput, is contingent upon its received carrier-to-interference-plus-noise ratio (CINR) and the amount of bandwidth allocated to this RBM given a selected carrier. The received signal strength of an RBM is determined by the transmit power of a serving hub and the path loss between the serving hub and the RBM. The received interference-plus-noise level of an RBM is determined by the transmit powers of all interfering hubs and path losses between interfering hubs and the RBM. An RBM is affected by an interfering hub when a desired signal and an interfering signal are transmitted over the same carrier frequency.

In frequency reuse of 1, multi-sector deployment, there are two main types of interference, namely intra-cell interference and inter-cell interference. The problem of resource allocation and scheduling has been extensively researched in multiple dimensions, e.g., time, frequency and space. Fractional frequency reuse techniques coupled with power management have been researched and many methods have been proposed in the literature to obtain a good performance trade-off. However, the system performance is far from an interference-free performance upper bound in terms of capacity and reliability.

In typical wireless backhaul networks, hubs and RBMs are deployed at fixed locations, and hubs are located at elevated locations with sufficient height above obstacles or other environmental clutter. For example, in an urban area, hubs may be positioned on a tall building or a rooftop, above the clutter. Each RBM is typically co-located with an access network base station, e.g. for a small cell base station, on a utility pole, a sidewall of a building or other location below the roofline. Thus, typically there is not a direct line of sight (LOS) between an RBM and a hub.

For example, each site or cell may comprise three sectors, i.e. three hub modules with directional antenna, with each hub module serving a cluster of up to four RBMs. The above referenced related U.S. patent application Ser. No. 14/129,150, describes a method and apparatus for determining network clusters for wireless backhaul networks, i.e., determining which RBMs are assigned to each serving hub to provide improved system performance.

For systems in which each hub module has multiple beams, proper hub-beam selection for each hub-RBM radio link can further improve system performance. Known methods for hub-beam selection include geographic location-based hub-beam selection. However, when a new RBM joins the network, such methods for selection for the new RBM may disrupt operation of other hubs and RBMs, i.e. cause inter-site or intra-site interference with other existing RBMs and hubs already in operation.

An object of the present invention is to provide an improved or alternative method and system for hub-beam selection in wireless networks and particularly for wireless backhaul solutions comprising fixed or stationary nodes with directional antennas, including small-cell non-line-of-sight (NLOS) wireless backhaul networks.

SUMMARY OF INVENTION

Thus, the present invention seeks to provide a method and system for coordinating hub-beam selection in wireless backhaul networks comprising hubs with multi-beam antennas.

One aspect of the invention provides a method of coordinating hub-beam selection in a wireless backhaul network, the network comprising a plurality of sites wherein each site comprises a plurality of hub modules, each hub module having multi-beam antenna, and each hub module serving a plurality of remote backhaul modules (RBMs), the method comprising:

obtaining for each of a set of RBMs in at least part of the wireless backhaul network (neighborhood), data indicative of path loss for hub-RBM radio links for each hub-beam of a respective serving hub;

from the data indicative of path loss computing a performance metric for the hub-RBM radio links for each hub-beam; and selecting a hub-beam for each of the set of RBMs that optimizes said performance metric across the set of RBMs of the neighborhood.

Thus, the method provides for coordination of hub-beam selection across at least part of the network. Particular embodiments provided for coordination of beam selection across a neighborhood comprising all or part of the network, using a performance metric such as a sum utility function for the set of RBMs and their serving hubs.

In one preferred embodiment, the method comprises obtaining data indicative of path loss for each RBM and each hub-beam of its serving hub, for at least part of the wireless backhaul network (i.e. neighbourhood), computing a path loss (PL) or other performance metric to provide a map which is shared between hubs of the neighbourhood, and making a beam selection for each hub-RBM link by optimizing the performance metric for the RBMs of the neighbourhood. In this embodiment, measurements are made for at least a subset of RBMs of the network and for each RBM, measurement of path loss is for all hub-beams, e.g. the floodlight, centre, left and right hub-beams for hubs having four beams. This provides multisite coordination of hub-beam selection, based on optimizing an appropriate performance metric, such as a sum utility function, e.g. log sum throughput, or a sum of gradients of RBM utilities across the neighbourhood. Optionally, joint hub-beam selection and RBM-to-slot assignment may be implemented to further increase the performance of the network.

This methodology comprises obtaining network performance metrics, e.g. information comprising path loss (PL) or channel gain for each hub-RBM link of the network. For example, the channel quality for each RBM-to-hub radio link of the network is measured and populated into a lookup table, referred to as radio frequency environment characteristics (RFEC) Table. Methods for channel quality measurements are described in related U.S. patent application Ser. No. 13/230,368, filed on Sep. 12, 2011, entitled "System and Method for Co-Channel Interference Measurement and Managed Adaptive Resource Allocation for Wireless Backhaul". The "MARA Matrix" referred to in this application is equivalent to the RFEC table described herein.

The RFEC measurements preferably comprise using reserved frames to train an RBM on each hub-beam of its serving hub and obtaining measure data for estimating the PL for each hub-beam. Depending on the size of the network and the number of hubs and RBMs, and the number of time slots, such an approach may require a very large number of measurements and computations (full RFEC measurements) over multiple hub-beams for each hub-RBM link of the neighbourhood. In some embodiments, to reduce the number of measurements and computations, partial RFEC measurements are made to obtain data indicative of path loss for only a subset of RBMs for each hub-beam of its serving hub. For other RBMs, the path loss data is estimated by interpolation, e.g. curve fitting. Thus, in one embodiment, the method comprises measuring data indicative of path loss for all hub-beams, e.g. the floodlight, centre, left and right beams of a four-beam antenna, for only one RBM or a subset of RBMs in each cell or sector. For other RBMs of each cell or sector, the path loss data for other hub-beams is obtained by curve fitting, optionally with smoothing.

In another embodiment, a PL for the hub-RBM links for each RBM and each hub-beam in the neighbourhood is initially estimated using a Radio Frequency (RF) planning tool. Subsequently, when the network is deployed, PL values are updated using measured PL data.

In some embodiments, for reduced computational complexity, beam selection may be coordinated for only a small subset of hubs and RBMs, e.g. on a per-site or per-sector basis, for example, when an RBM joins the network at a particular site. Thus, full RFEC measurements, partial RFEC measurements and/or initial pre-deployment estimation with post-deployment measurements and adjustments, may be used.

The performance metric, e.g., a sum utility function or path loss may be optimized over a neighbourhood comprising at least part of the network, or on a per-site or per-sector basis. In some embodiments a beam assignment map is shared across the neighbourhood.

The method may comprise hub-beam selection with fixed RBM-to-slot assignments. Alternatively, the method further comprises joint hub-beam selection and RBM-to-slot assignments. For example, after picking a serving hub-beam as described above, the method further comprises generating a table of bad hub-beam combinations and good hub-beam combinations, assigning a weight to each hub-beam combination, and shuffling RBMs in a slot assignment map such that a cost function is minimized.

The method may comprise, in a training cycle, transmitting, from a respective serving hub, a special downlink subframe and transmitting, from the RBM, a special uplink frame to obtain channel gain information for each hub-beam of the serving hub. In a measurement cycle, a hub-beam selection DL subframe is transmitted from each hub-beam enabling the RBM to train an equalizer and decode a known data burst to obtain a channel estimate for each hub-beam.

Another aspect of the invention provides a system in a wireless network comprising processor means, i.e., a centralized processor or distributed processor units, configured for implementing steps of the method for coordinating hub-beam selection.

Another aspect of the invention provides a computer readable storage medium, which may be a distributed computer readable storage medium, storing instructions, which when executed by distributed or centralized processing means of the network, perform steps of the method.

Simulations demonstrate that systems and methods according to embodiments of the invention can provide improved coordination of hub-beam selections to spatially separate RBMs so as to get closer to interference-free environments.

Thus, systems and methods according to embodiments of the invention provide practical schemes for coordinating hub-beam selection for each hub-RBM radio link in a wireless backhaul network, where each hub has multiple hub-beams. For example, this methodology allows for a new RBM to be added to a site without significantly interfering with or disrupting operation of existing hub-RBM radio links of the wireless backhaul network, or, hub-beam assignments of other hubs in the sector or site may be updated to accommodate an additional RBM without degrading performance of existing hub-RBM links in operation.

Simulations demonstrate that systems and methods according to embodiments of the invention can provide improved coordination of hub-beam selections to spatially separate RBMs to get closer to interference-free environments.

The foregoing, and other objects, features, aspects and advantages of the present invention will become more apparent from the following detailed description, taken in conjunction with the accompanying drawings of preferred embodiments of the invention, which description is by way of example only.

BRIEF DESCRIPTION OF DRAWINGS

FIG. 8 shows an example of a table of path loss values for 3 RBMs on each of a plurality of hub-beams;

FIGS. 9A and 9B show examples of weight tables for good beam combinations and bad beam combinations, respectively; and FIGS. 10A and 10B show examples of slot assignment tables before and after shuffling slot assignments to improve performance.

DETAILED DESCRIPTION OF EMBODIMENTS

Figure 1:
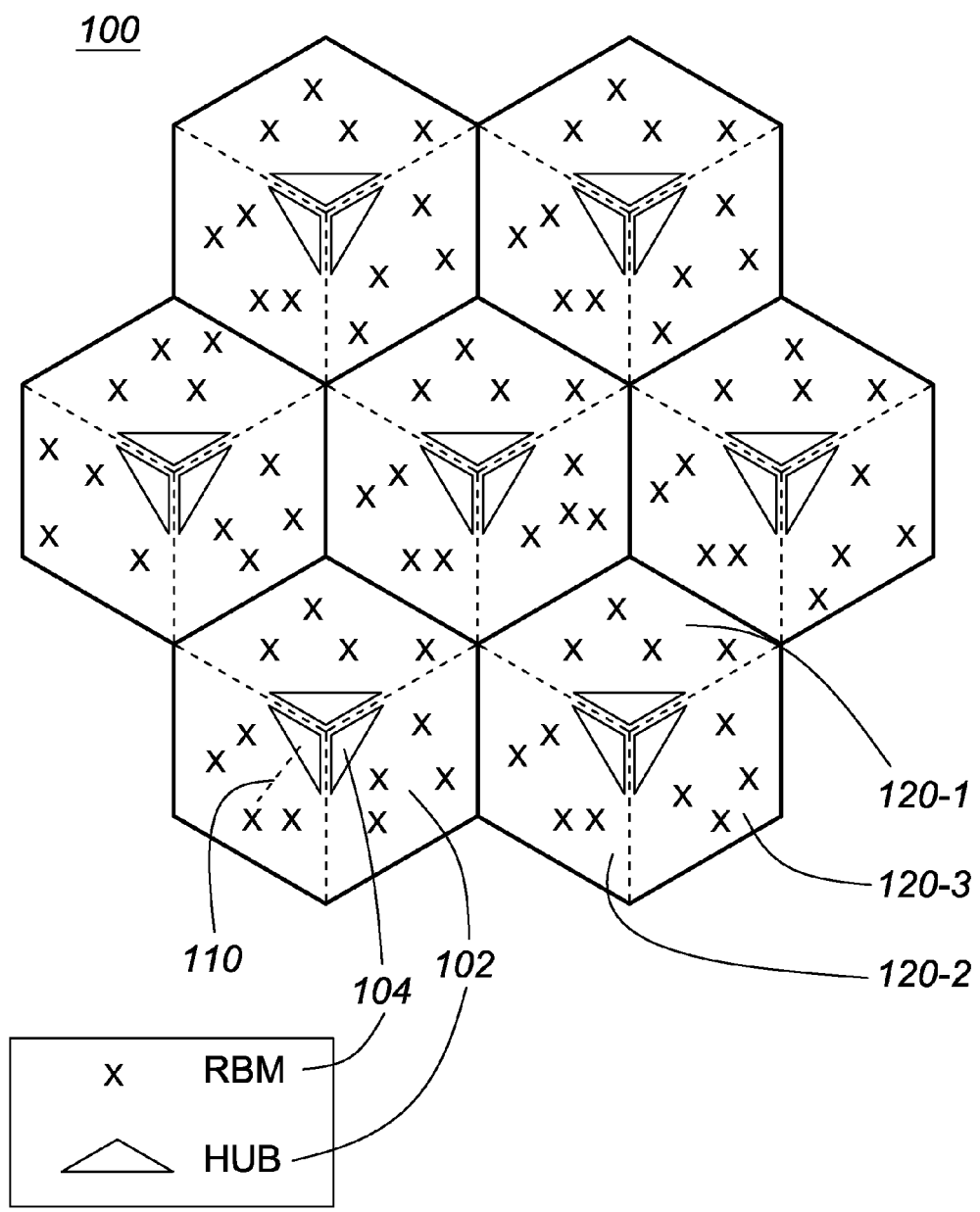
FIG. 1 shows a schematic diagram of a wireless backhaul network comprising a plurality of hubs, each serving a plurality of Remote Backhaul Modules (RBMs) for implementing a method for hub-beam selection and slot assignment according to an embodiment of the present invention.

A system and method for hub-beam selection in a wireless backhaul network according to embodiments of the present invention will be described, by way of example, with reference to a NLOS wireless backhaul network 100, as illustrated schematically in FIG. 1, which represents schematically the topology of a system comprising a point-to-multipoint wireless backhaul network, comprising a plurality of fixed nodes. That is, the nodes comprise a plurality of hubs 102 and RBMs 104. By way of example only, the wireless backhaul network 100 shown in FIG. 1 comprises a plurality of seven sites or cells, each site comprising three hub modules 102, with each hub module serving a sector 120 comprising a cluster of a plurality of Remote Backhaul Modules (RBMs) 104. Thus, there are 21 sectors, each with a hub module 102, serving a cluster of up to four RBMs. As shown, three hubs modules 102, each with multibeam antenna, are co-located in each of the cell centers, with a cluster of RBMs mapped to each respective serving hub, in each of the three sectors 120-1, 120-2, 120-3 of the cell. The frequency reuse factor of the system is 1.

Figure 2:
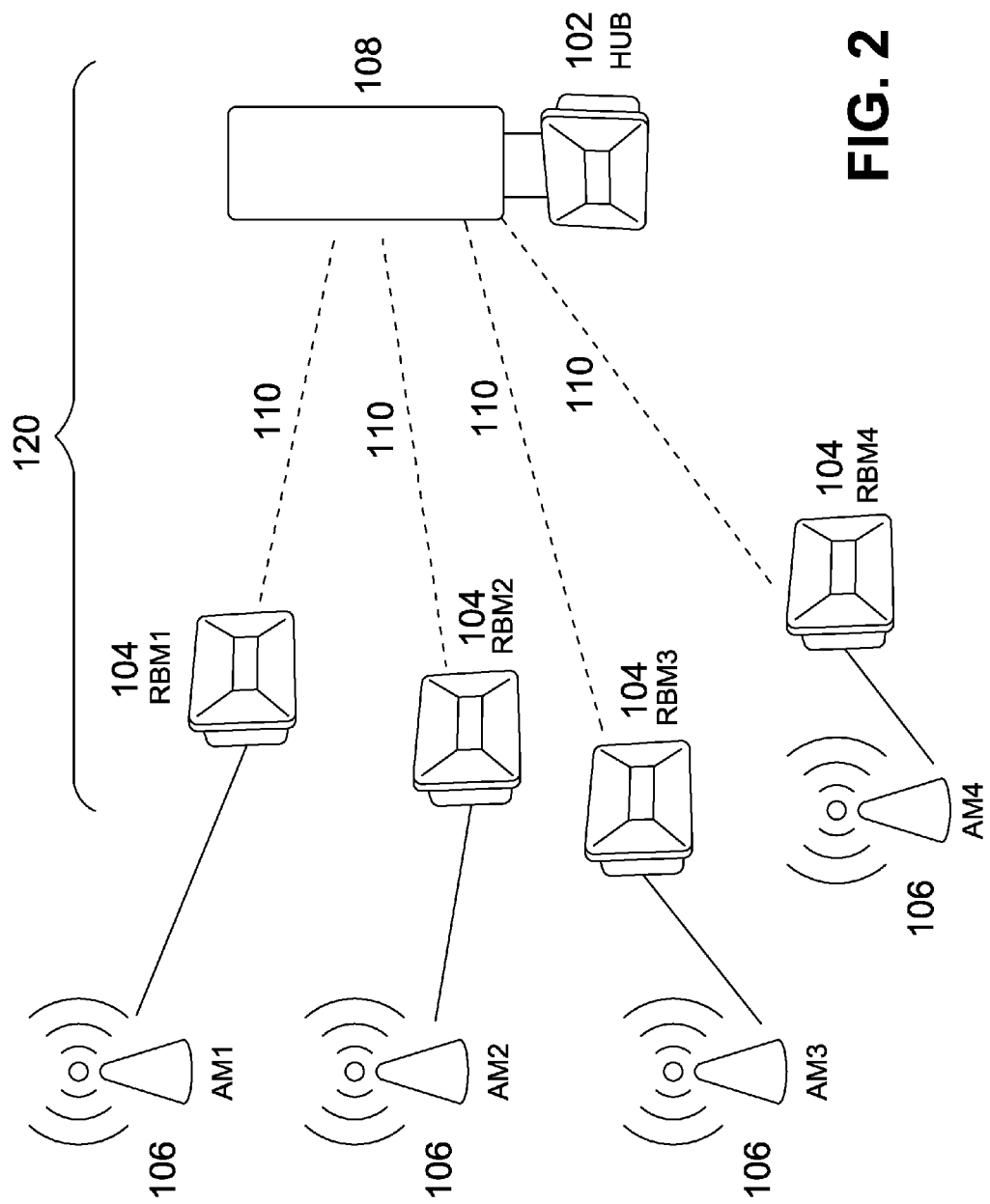
FIG. 2 shows a schematic diagram of part of the wireless backhaul network comprising one cluster of four RBMs served by a hub module, each RBM being wired to an access module of an access network.

In each sector 120, a hub 102 serves its set or cluster of Remote Backhaul Modules (RBMs) 104 through wireless links (radio links) 110, as shown schematically in FIG. 2. Each RBM 104 communicates with and is co-located with an access module (AM) 108 of an access network, such as a small cell-base station, using a wired connection, e.g. an Ethernet cable. The hub module 102 has a multibeam antenna 108 and RBMs 104 each have an integrated directional antenna that is directed towards the hub. Unlike a multi-hop architecture, each link 110 comprises only one hop from each RBM 104 to a respective hub to carry the traffic. It is also different from the relay system where the access links and relay links share the same radio frequency band. The backhaul network operates at a different frequency band from that of the access network.

Methods of coordinating hub-beam selection in a wireless backhaul network according to embodiments of the invention comprise: obtaining for each of a set of RBMs in at least part of the wireless backhaul network (neighborhood), data indicative of path loss for hub-RBM radio links for each hub-beam of a respective serving hub; from the data indicative of path loss computing a performance metric for the hub-RBM radio links for each hub-beam; selecting a hub-beam for each of the set of RBMs that optimizes said performance metric across the set of RBMs of the neighborhood; and for each RBM of the neighborhood, communicating to its serving hub the respective hub-beam identification.

Thus, for example, an RBM is first associated to its serving hub based on a predefined metric, such as distance, or other method of clustering RBMs to a serving hub. The channel quality for each RBM-to-hub radio link is estimated or measured and populated into a lookup table, referred to as Radio Frequency Environment Characteristics (RFEC) table. Methods for channel quality measurement are described in related U.S. patent application Ser. No. 13/230,368, filed on Sep. 12, 2011, entitled "System and Method for Co-Channel Interference Measurement and Managed Adaptive Resource Allocation for Wireless Backhaul". This application refers to the RFEC table as a "MARA Matrix". The RFEC table is preferably stored in a centralized server, e.g., network control server, which manages joint scheduling and channel allocation across the wireless backhaul network, and may also manage power control or other functions. To account for the changes in the network environments, channel quality measurements can be done on a periodic or regular basis, to update the RFEC table (MARA Matrix) as required.

Figure 3:
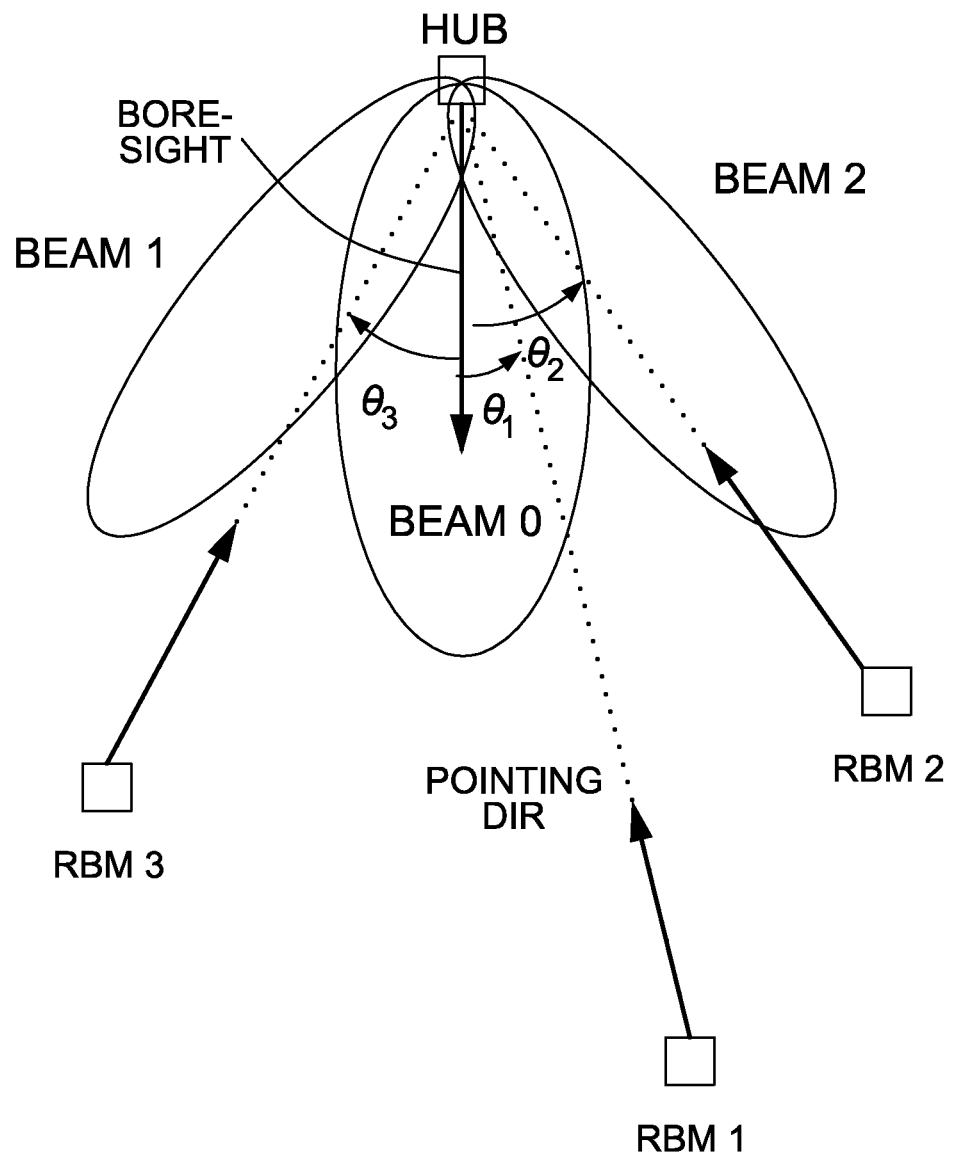
FIG. 3 shows schematically a multibeam hub having Beam 0, Beam 1, Beam 2 serving three RBMs.

In a wireless backhaul network where each hub module has multiple beams, for example, Beam 0, Beam 1 and Beam 2, as illustrated schematically for a single hub in FIG. 3, each of the RBMs, i.e., RBM1, RBM2 and RBM3, served by the hub are located as required, with the directional antenna of the RBM pointing towards their serving hub. Advantageously, coordination of the hub-beam selection for each hub-RBM radio link can be used to reduce intra-cell or inter-cell interference and improve performance.

A hub module may, for example, be equipped with a multi-beam antenna which has four beams, i.e., floodlight (sectoral), center, right and left beams. A six-beam antenna hub module may additionally have intermediate right and intermediate left beams.

Certain antenna-beam combinations can produce significant intra-site interference. For example, in a 3-sector cell deployment, if sector 1 uses the R beam and sector 2 uses the L beam, intra-site interference in sectors 1 and 2 may be negligible. On the other hand, if sector 1 uses the L beam while sector 2 uses the R beam, intra-site interference may be intolerable. When a new RBM joins a network, it is desirable that an appropriate hub-beam is selected for the new hub-RBM link, to avoid significant inter-site or intra-site interference, which would impact performance of hub-RBM radio links for other hubs and RBMs already in operation.

A methodology is presented herein for coordinating hub-beam selection for a set of hubs and RBMs of at least part of the network (neighborhood), to improve system performance, e.g., based on a performance metric, such as a sum utility function across the neighborhood. Beam selection is implemented on a neighborhood level, i.e., across multiple sectors, across multiple sites or even across the entire network. Where it is desirable to reduce the number of measurements and/or computational complexity, beam selection may be coordinated over a neighborhood of a small set of hubs, such as a per-site or per-sector basis only, e.g. when an individual new RBM joins the neighborhood.

Figure 4:
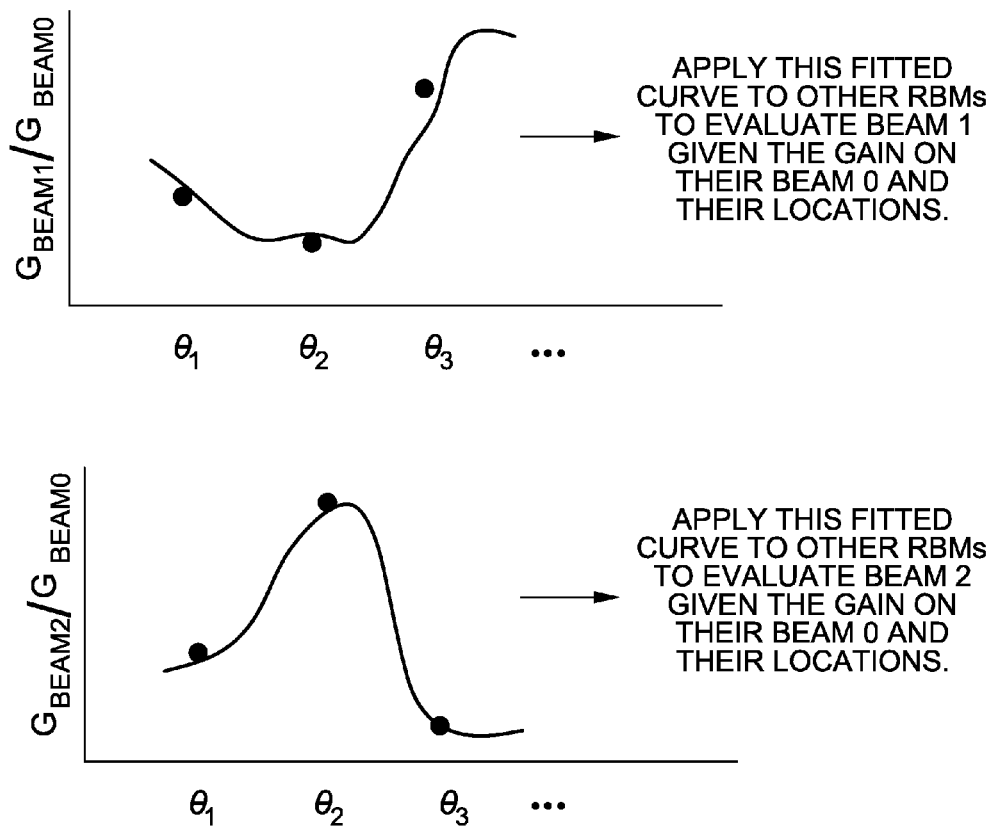
FIG. 4 shows plots of the relative gain of Beam 1 vs. Beam 0 and of Beam 2 vs. Beam 0 for the hub and 3 RBMs illustrated in FIG. 3, for hub-beam selection according to an embodiment based on interpolation using a curve fitting methodology.

For each RBM, the path loss (PL) or channel gain is obtained for each hub-beam by measurement and/or estimation, i.e., in a RBM training and measurement phase. That is, RFEC measurements may be made to obtain the PL of all beams of the serving hub, for each RBM. Alternatively, full RFEC measurements may be made for only a subset of RBMs. For other selected RBMs, partial RFEC measurements may be made for a reference beam only of the serving hub, and then interpolation such as curve fitting or other is applied to estimate the PL for the other beams of the serving hub. For example, where curve fitting is implemented for estimation of PL, FIG. 4 shows plots for one RBM of the channel gain for Beam 1 relative to Beam 0, and for Beam 2 relative to Beam 0, as will be explained in detail below. Alternatively, PL data for all or some RBMs and their serving hubs may initially be estimated using pre-deployment RF planning tools and then verified and adjusted by post-deployment measurements.

Time is divided into cycles and each cycle comprises what may be referred to as a data collection phase, and a parameter application phase. In the data collection phase, the system obtains data indicative of PL or channel gain, i.e. by measurements and/or estimation, which may include, what is referred to as RBM training and measurement, data is reported to a processing unit. The processing unit, which may be a centralized system or a distributed system, depending on whether beam selection is made on, e.g., a per-hub basis, a per-cell or a per-site basis for several co-located hubs, or over a wider RF neighborhood, i.e., across a plurality of cells or sites of the wireless backhaul network. In the parameter application phase, based on the channel estimates or channel measurements, a selected performance metric is computed and a beam selection is then made to optimize the selected metric, e.g., to maximize a sum utility across the RF neighborhood or to select hub-beams with minimum PL for a beam selection on a per-site basis.

Beam Selection on a Local, Per Hub Basis.

Mathematically, one simple hub-beam selection algorithm for each RBM can be given as follows:

$$i = \underset{j \in S}{\operatorname{argmin}} \{PL_j\}$$

where S is a set of available hub-beams, and $PL_j$ is the path loss between the serving hub-beam j and the RBM.

Where PL or channel gain is to be measured for each hub-beam of the serving hub, when an RBM joins the network, a special downlink/uplink (DL/UL) subframe is dedicated to obtaining channel gain information for the RBM for each of the hub-beams of its serving hub. The RBM then uses a special beam selection frame to train an equalizer and obtain the channel estimate of each of the available hub-beams.

Figure 5:
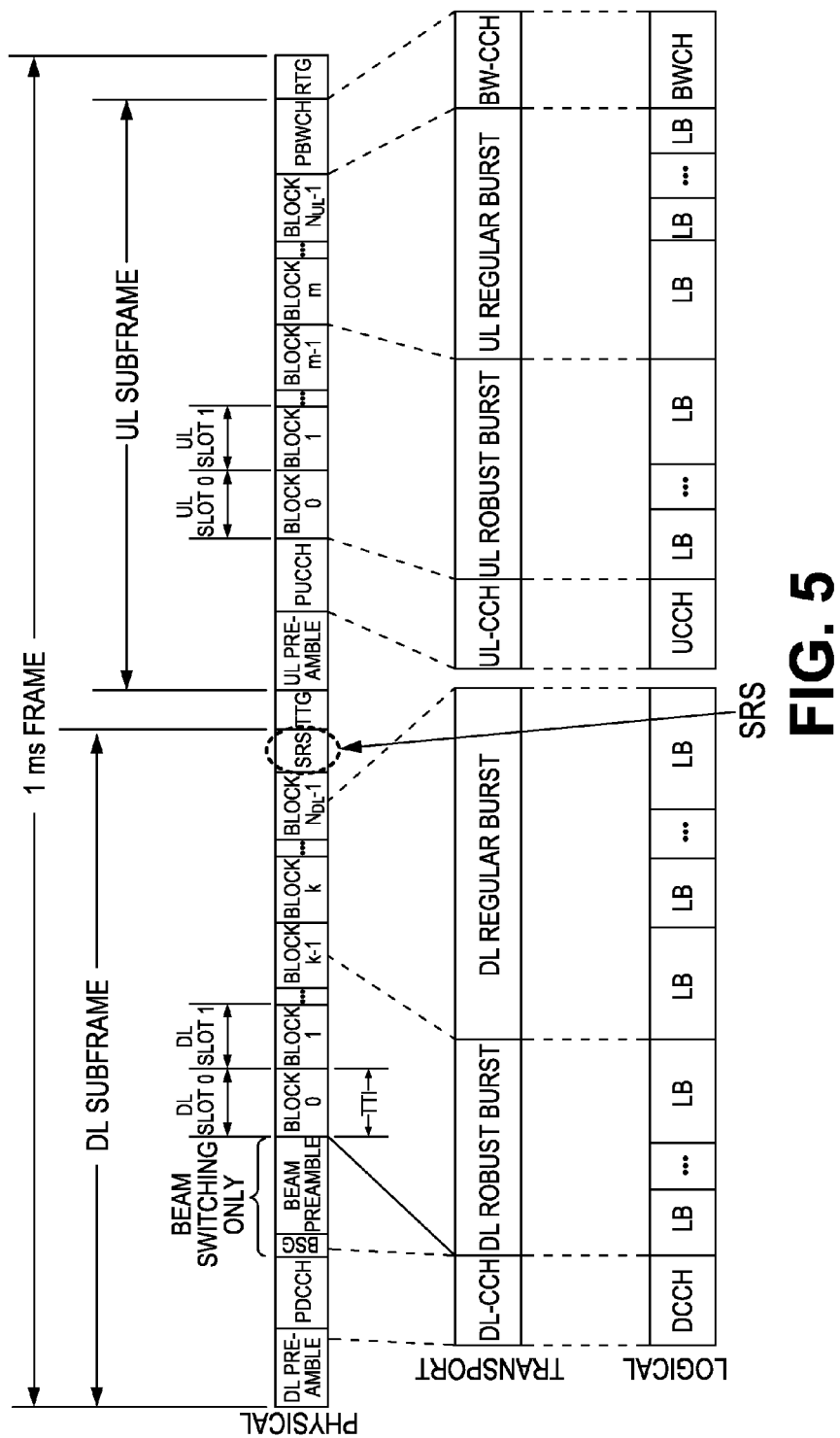
FIG. 5 shows schematically the reserved frame structure for the downlink subframe (hub transmits) and uplink subframe (RBM transmits) for implementation of a method of hub-beam selection according to an embodiment of the present invention.

For example, as shown in FIG. 5, which illustrates a unicast frame structure for hub-RBM transmissions to determine which beam is to be used for an RBM, which joins (enters) the network for ranging/registration, each frame is 1 ms long. The frame is divided into a DL subframe, i.e., the Hub transmits, and a UL subframe, i.e., the RBM transmits. The subframes are separated by a TTG-transmit termination gap and an RTC-receive termination gap. The gaps allow the radio to switch between transmit and receive and account for the round trip delay. If required, for the DL subframe only, a set of slots at the end of the subframe can be dedicated to a Sounding Reference Signal (SRS) transmission from the hub. These slots are used for RFEC (MARA Matrix) measurements.

Figure 6:
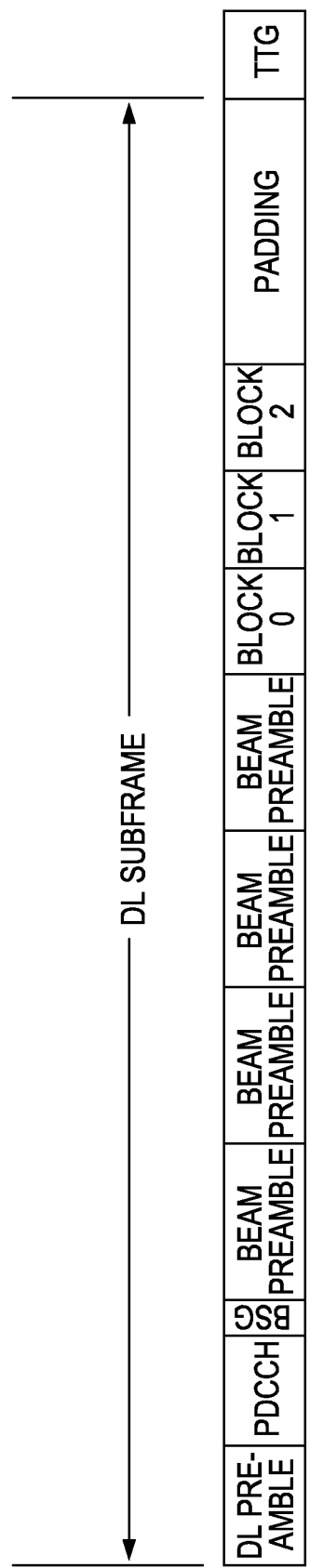
FIG. 6 shows schematically a special frame structure comprising a downlink beam selection subframe.

For beam selection, a special DL subframe is transmitted for each beam right after the initial ranging, which allows the RBM to train the equalizer and decode a known data burst. The structure of the DL beam selection subframe is shown in FIG. 6.

The step of beam selection may be made by the RBM or the serving hub, depending on the sequence of information exchange and whether processing is carried out on a centralized or distributed server/processor. For example, the RBM can report PL values to its serving hub, and then the serving hub picks the beam with the minimum PL. Alternatively, the RBM can select the beam with the minimum PL, and send the beam ID to the serving hub.

Example 1-1

Time is divided into cycles. Each cycle comprises a data collection and training phase and a beam selection phase with parameter application. The system performs PL training for each beam of each hub. Each RBM performs measurements of the PL of each beam of its serving hub. The measurements are then reported to the processing unit, which in a distributed implementation may be a local processing unit of the serving hub, or a central processing unit of the backhaul network.

For example a set of PL measurements are collected as shown in FIG. 8 for each RBM-hub-beam:

Beam selection—In a distributed implementation, based on the RFEC measurements, each RBM picks the hub-beam with the lowest PL and communicates this decision to its serving hub. In a centralized implementation, the processing unit/server determines the best hub-beam for each RBM and issues a hub-beam selection command to each hub. All hubs are then configured to use the selected hub-beams for transmission to the respective RBMs.

Example 1-2

Time is divided into cycles. Each cycle comprises a data collection and training phase and a beam selection phase with parameter application. Data collection and training—In this embodiment, a subset of RBMs is picked, e.g., RBM subset A to perform RFEC training for all beams of each hub, and each RBM measures the PL of each beam of its serving hub. For the rest of the RBMs, i.e., RBM subset B, RFEC is performed to obtain the PL for a reference beam only.

For example, when a new RBM of subset B joins the network, it measures only the channel gain or PL for the reference beam, i.e., it measures only the floodlight preamble from the serving hub. This RBM then trains the equalizer and obtains a channel estimate of the floodlight beam. The RBM reports to the processing unit, i.e., in a distributed system, it reports to its serving hub, and gives its location and the PL value for the reference floodlight-beam gain to the serving hub.

The processing unit of the serving hub estimates the gains of the other hub-beams based on the floodlight-beam gain and the locations of the RBM using fitted curves. For each RBM of subset B, the processing unit computes the polar coordinates of the RBM, based on its location, with respect to the reference beam of the serving hub.

The processing unit normalizes all beam gains with respect to the reference beam based on data from RBM subset A. Based on the polar coordinates of the RBMs, with or without knowledge of their antenna patterns, a curve fitting algorithm is applied to obtain a polynomial curve of normalized beam gains vs. polar angles. Fitted curve smoothing may be applied to remove outliers (see FIG. 5). For an RBM of subset B, the different beam gains are estimated by inputting its polar coordinates to the fitted curves. The serving hub then makes a beam selection for that RBM that provides a minimum PL. In variants of this embodiment, in a distributed implementation, each RBM may pick the hub-beam with the lowest PL and communicate this to its serving hub. In a centralized implementation, the processing unit determines the best hub-beam for each RBM and issues the hub-beam selection command to all hubs. Thus, all hubs are configured to use the selected hub-beams for data transmission to respective RBMs.

Example 1-3

In this embodiment, instead of measuring channel gains, a RF pre-deployment tool is run to predict the channel gains of all beams from a serving hub to an RBM. The serving hub uses this information to makes a beam selection that has a minimum PL or the RBM uses this information to select the beam that has the minimum PL and sends the corresponding beam ID to its serving hub.

As described above, time is divided into cycles. Each cycle comprises a data collection and training phase and a beam selection phase with parameter application.—A data correction phase is added to correct the inaccuracy in the pre-deployment RF planning tools, if required.

Thus, the RF planning tool is run to generate data to populate the RFEC table, which is stored in the processing unit. Based on the stored RFEC table, each RBM picks the hub-beam with the lowest PL and communicates the selection to its serving hub (in a distributed system). Alternatively, in a centralized system, the central processing unit selects the best hub-beam for each RBM and issues the hub-beam selection command to each hub. Each hub is configured to use the selected hub-beam for data transmission to its serving hub. After deployment, the actual PL may be measured for each RBM and each hub-beam during operation. The delta difference between the actual PL and predicted PL is computed. The hub-beam selection algorithm may then be repeated with the adjusted PL values.

The above described embodiments 1-1, 1-2, and 1-3 provide hub-beam selection on a per-sector or per-cluster basis only. In some embodiments, beam selection is made using neighborhood level information to provide beam selection on a per-cell/per-site basis or across a larger RF neighborhood of the wireless backhaul network. To implement this solution, metrics are obtained for all RBM-to-hub links in the RF neighborhood, for example, a path loss map or beam assignment map for a number of co-located hubs at the same site. Beam selection is then made based on optimizing a parameter across the RF neighborhood, e.g., by maximizing a sum utility function, such as a simple RBM sum utility or a sum of gradients of RBM utilities across the RF neighborhood.

Figure 7A:
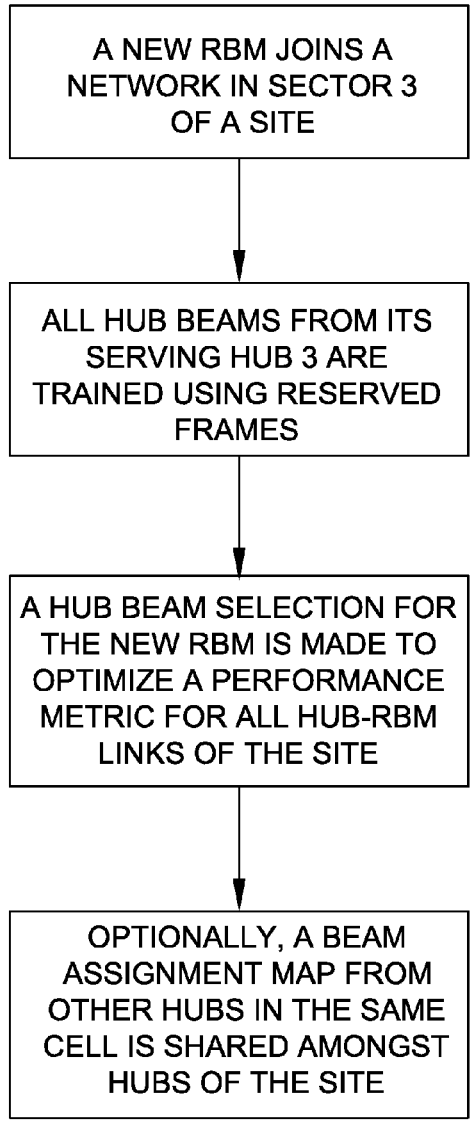
FIG. 7A shows a flow chart for steps of a method for an example scenario.
Figure 7B:
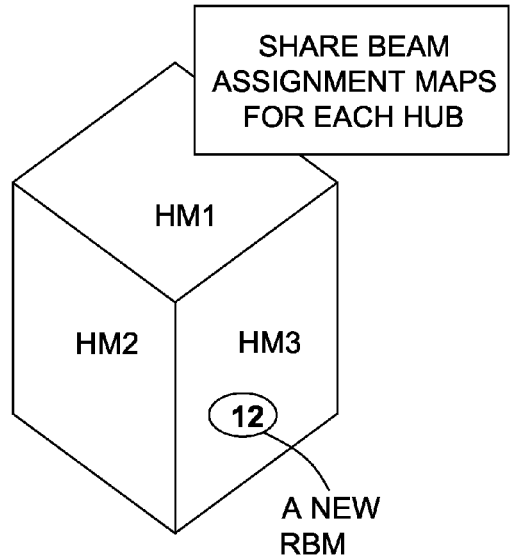
FIG. 7B illustrates schematically sharing of beam assignment maps between co-located hub modules at a cell site, for implementation of the method when a new RBM joins the network.

Neighborhood level information may be obtained, using a special frame structure similar to that described above, by PL measurements for each hub-beam of a PL for each RBM-hub link, by measurement of PL for reference beams only and estimation of channel estimation for other hub-beams. Channel estimation may comprise a curve fitting approach to obtain neighborhood PL maps. Hub-beam assignments may be measured on a per-hub basis for each sector or cluster, and then hub-beam assignment maps are exchanged between hubs (see FIGS. 7A and 7B).

The hub-beam selection algorithm for each RBM can be given as follows:

$$i = \arg\max_{j \in S} \{\Sigma_{k \in RFN} U_k(M_j)\}$$

where S is a set of available hub-beams, and $U_k(M_j)$ is the utility function of RBM k in the same RF neighborhood with metric $M_j$, $M_j$ is the metric if the RBM uses serving hub-beam j. For example, the utility function may be a sum log throughput, or other suitable utility function.

The algorithm can be executed as follows: Given an RBM-to-timeslot assignment matrix, for each timeslot, hubs take turns to pick the best hub-beam for their scheduled RBM one by one such that the sum utility is maximized. To compute the sum utility within a neighborhood, we need to obtain in-neighborhood PL (via any proposed method described earlier). RBMs then measure and report their aggregate IoT to the processing unit via their serving hub. The processing unit computes the out-of-neighborhood IoT for each RBM in the same neighborhood. This algorithm can be applied to a sector, a site, a collection of sites, or an entire network. In the case of per-sector coordination, the results would be the same as the per-sector PL-based selection algorithm of example 1-1.

Example 2-1

Measurement and training: during frequency scanning and/or RBM pointing during installation of a new RBM, the RBM listens to the beam preamble, i.e., floodlight preamble, on the broadcast frame of each hub and tries to obtain the channel gain information of each hub. Based on the measured floodlight preambles, the RBM decodes the preamble, trains an equalizer and measures the PL of the floodlight of each of the hubs.

Beam Selection—The RBM reports the floodlight PL values of the other hubs to its serving hub; the hub interpolates the PL value of other beams for each hub. Together with PL information of the serving hub-beams, the serving hub shares this PL map with other co-located hubs at the same cell/site. The hub then runs algorithm, based on optimizing a neighborhood level metric such as a sum-utility or gradient sum-utility, i.e., to pick the hub-beam that optimizes the selected metric across the all hubs at the site.

Example 2-2

Measurement and training: Referring to FIG. 5, a set of slots is shown at the end of the DL subframe, which can be dedicated to a Sounding Reference Signal (SRS). The sounding reference signal can be used to perform PL estimation of all hubs that an RBM can listen to. This information is transmitted by the RBM to the serving hub and a PL map is generated by the serving hub.

For beam selection, the serving hub shares this PL map with other co-located hubs in the same RF neighborhood, i.e. co-located hubs at the same site. The hub runs an algorithm to optimize a selected neighborhood level metric such as a sum-utility and picks the hub-beam that optimizes the selected metric across the all hubs of the neighborhood.

Example 2-3

Measurement and training: As in examples 1-1, 1-2, and 1-3 above, when an RBM joins the network, there is a special DL/UL subframe dedicated to obtain the channel gain information for each of the hub-beams of its serving hub. The RBMs use an antenna beam selection frame to train an equalizer and obtain the channel estimate of each of the available hub-beams.

Beam selection: Hubs in the same RF neighborhood share the hub-beam assignment maps. The serving hub of a newly joined RBM selects the best beam for this RBM, i.e., the one that causes least interference to the other existing RBMs in other hubs in the same RF neighborhood. Mathematically, given the weights for all the beam combinations, this hub selects the hub-beam that maximizes a sum utility or minimizes the cost.

Example 3-1

Time is divided into cycles. Each cycle comprises a data collection and a beam selection phase with parameter application.

In the data collection phase, measurements are made for in-neighborhood PL by a method such as described in the previous examples 1-1, 1-2 and 1-3. Measurements are also made for an aggregate interference—plus-thermal noise or interference-over-thermal noise (IoT). RBMs measure and report their aggregate IoT to the processing unit via their serving hub. The processing unit computes the out-of-neighborhood IoT for each RBM in the same neighborhood.

Based on a slot assignment map, such as shown in FIGS. 10A and 10B, for each RBM, the processing unit selects a hub-beam is to optimize a selected metric, e.g., to maximize a sum utility function, such as, a sum log throughput for the RF neighborhood.

Example 3-2

In a variant of example 3-1, the method is similar except the selected metric is a sum of the gradients of log throughputs.

Joint Hub-Beam Selection and Slot Assignment.

In the embodiments described above, the hub-beam selection for each RBM is made independently of slot assignments (time slot assignments) or based on fixed slot assignments.

Beneficially, for some scenarios, joint hub-beam selection and slot assignment provides a further performance improvement.

Accordingly, in a method for joint hub-beam selection and slot assignment according to another embodiment of the present invention, a serving hub-beam for each RBM is selected based on an appropriate per-neighborhood or per-site metric, e.g., as described above. A table of good hub-beam combinations and bad hub-beam combination is defined. A weight is assigned to each hub-beam combination, for example, a table is generated such as shown in FIGS. 9A and 9B.

This is a heuristic approach on beam weight tables. That is, good combinations are assigned a low or negative weight and bad combinations are assigned a higher weight. Slot assignment can then be optimized by minimizing the weights. Good and bad combinations may be determined by simulations starting with experienced based knowledge (prior measurements, an intuitive or educated guess) that certain antenna beam combinations are more likely to produce significant intra-site interference. A best beam-per-site assignment seeks to avoid as much as possible using "bad" beam combinations at each time slot and encourage using "good" beam combination at each time slot. A more concrete description of this algorithm is given as follows: we assume that RBM-to-hub associations are already made and the hub beams and beams of the RBMs are already selected (using a baseline selection as explained in Section 4.1). Let $N_s$=the number of HMs per-site.
$T$=the number of time slots.
$B$=an $N_s \times T$ beam assignment matrix where $[B]_{it} \in \{F, C, R, L, IR, IL\}$ is the beam used by HM i at time slot t. For simplicity, we assume T is equal to the number of RBMs per HM, so $[B]_{it}$ can also be considered as the beam used by the hub i to communicate with the RBM t.
$RBM_{map}$=an $N_s \times T$ RBM-to-HM association matrix where $[RBI_{map}]_{it}$ is the ID of the RBM which is connected to the hub i at time-slot t.
Initial beam assignment matrix $B_{in}$.
Initial RBM-to-hub association matrix $RBM_{map,in}$.
Tables of "good" beam combinations and "bad" beam combinations with the weight of each combination. FIG. 9B provides a list of 21 "bad" beam combinations and the weight of each combination. Similarly, FIG. 9A provides a list of 5 "good" beam combinations and the weight of each combination. The weight is a normalized number between +1 and −1, where +1 means the least favorable combination and −1 means the most favorable combination. The weights can be tuned off-line to optimize the performance. Through initial intuitive estimates and simulations, weights were found that yielded good performance.

The RBMs are then shuffled in the slot assignment map such that the cost function is minimized. FIGS. 10A and 10B show an example of a slot assignment table before and after the shuffling algorithm is applied. The hub-beam selections are then updated again if necessary.

In summary, for some embodiments described above, for each hub-RBM radio link, RFEC measurements are obtained to estimate the PL of all beams of a serving hub. For some RBMs, RFEC measurements are obtained to estimate the PL of a reference beam only for the serving hub, and then curve fitting is applied to estimate the PL of difference beams of the serving hub, based on the reference beam and its relative position with respect to the serving hub. In some embodiments, the initial path loss information may be estimated using a pre-deployment RF planning tool. The RFEC table is preferably stored in a centralized server, e.g. network control server, which manages joint scheduling and channel allocation across the wireless backhaul network, and may also manage power control or other functions. To account for the changes in the network environments, channel quality measurements can be done on a periodic or regular basis, to update the RFEC table as required. Accordingly, the hub-beam selection algorithm may be re-run with updated PL data, to update hub-beam selections from time to time, if required.

Other aspects of the invention provide a processing means, i.e., a distributed processors or a centralized processing unit/server of the wireless backhaul network which is configured to perform steps of the method of hub-beam selection and/or joint hub-beam selection and slot assignment. Such a system having a distributed or centralized processor or processors may further comprise one or more centralized or distributed computer readable storage media, storing instructions, which when executed by said processor or processors, perform the method steps of coordinating hub-beam selection. The controller comprising instructions for implementing the method for coordinating hub-beam selection module or method for joint beam selection and slot assignment module may comprise one or more a hardware modules; one or more software modules embodied in a computer readable storage medium; or a combination thereof.

Performance Evaluation.

Simulations were performed for hub-beam selection using fixed RBM-to-slot assignments and for joint hub-beam selection and RBM-to-slot assignments. PL based hub-beam selection with "perfect knowledge", i.e., actual PL data measured for each RBM and for each hub-beam-RBM link, achieves about 60% to 70% of the in-site IC upper bound gain. PL-based hub-beam selection using curve fitting, i.e., measurement of PL for selected RBM and a reference hub-beam only, achieves about 55% to 60% of the in-site IC upper bound gain. Sum-utility based hub-beam selection across a neighborhood achieves about 70% to 80% of the in-site upper bound gain. Joint hub-beam selection and RBM-to-slot assignment achieves about 80% to 85% of the in-site upper bound gain. The in-site IC upper bound is about 50% to 60% better than the baseline (Pmax=maximum power) plasma floodlight beam.

INDUSTRIAL APPLICABILITY

Effective methods for interference management using beam selection and/or slot assignment are disclosed, having applicability for fixed wireless backhaul networks. The proposed methods are, in general, more effective than traditional power control algorithms.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of coordinating hub-beam selection in a wireless backhaul network, the network comprising a plurality of sites wherein each site comprises a plurality of hub modules having multi-beam antenna, and each hub module serves a plurality of remote backhaul modules (RBMs), the method comprising:
    obtaining for each of a set of RBMs in at least part of the wireless backhaul network (neighborhood), data indicative of path loss for hub-RBM radio links for each hub-beam of a respective serving hub;
    from the data indicative of path loss computing a performance metric for the hub-RBM radio links for each hub-beam; and
    selecting a hub-beam for each of the set of hub-RBM links that optimizes said performance metric across the set of RBMs of the neighborhood;
    for each RBM of the neighborhood, communicating to its serving hub the respective hub-beam identification; and
    wherein obtaining said data indicative of path loss comprises performing measurements of Radio Frequency Environment Characteristics (RFEC measurements) for at least a subset of RBMs, using reserved frames to train each RBM on each hub-beam of its serving hub and obtaining measured data for estimating the path loss for each hub-beam.

2. A method of hub-beam selection according to claim 1, wherein the step of obtaining data indicative of path loss (PL) for hub-RBM radio links for each hub-beam of a respective serving hub comprises one of:
    a) for each RBM of the neighborhood, performing said RFEC measurements to obtain the PL for hub-RBM radio links for all hub-beams of its serving hub;
    b) for a subset of RBMs, performing said RFEC measurements to obtain the PL for hub-RBM radio links for all hub-beams of the respective serving hub, and for other RBMs performing said RFEC measurements to obtain the PL for hub-RBM radio links for a reference hub-beam only and interpolating for the PL of other hub-beams of the hub;
    c) for a subset of RBMs, performing said RFEC measurements to obtain the PL for hub-RBM radio links for all hub-beams of the respective serving hub, and for other RBMs performing said RFEC measurements to obtain the PL for hub-RBM radio links for a reference hub-beam only and then applying curve fitting for estimating the PL of other hub-beams;
    d) for a subset of RBMs, performing said RFEC measurements to obtain the PL for hub-RBM radio links for all hub-beams of the respective serving hub, and for other RBMs performing said RFEC measurements to obtain the PL for hub-RBM radio links for a reference hub-beam only and then applying curve fitting with smoothing for estimating the PL of other hub-beams;
    e) for each RBM, estimating an initial PL for hub-RBM radio links for each hub-beam using a pre-deployment RF planning tool; and post-deployment, performing said RFEC measurements and updating estimated PL data; and
    f) a combination thereof.

3. A method according to claim 1 wherein communicating to its serving hub the respective hub-beam identification comprises using a reserved hub beam selection frame.

4. A method according to claim 1, wherein the performance metric comprises a sum-utility-based metric, and wherein the step of selecting a hub-beam for each of the set of RBMs comprises optimizing the sum-utility over the set of RBMs of the neighborhood.

5. A method according to claim 4, comprising optimizing the sum-utility across the entire backhaul network.

6. A method according to claim 4 comprising optimizing the sum-utility across a selected set of sites of the network.

7. A method according to claim 4, wherein the sum-utility function comprises a sum-log throughput or a sum-gradient log throughput.

8. A method according to claim 1, wherein the performance metric comprises a minimum path loss per-sector and wherein the step of selecting a hub-beam for each of the set of RBMs comprises minimizing a path loss for each of a set of RBMs of a sector.

9. A method according to claim 8, wherein a beam assignment map comprising hub-beam selections for each RBM of the site is shared across all hubs of a site.

10. A method according to claim 1, wherein a beam assignment map for hub-beam selections for each RBM of the neighbourhood is shared across all hubs of the neighbourhood.

11. A method according to claim 1, wherein a beam assignment map for hub-beam selections for each RBM of the neighbourhood is shared with a centralized beam-selection server.

12. A method according to claim 1, wherein the performance metric comprises a cost function of a hub-beam combination for a set of sites, and wherein a weight table of good and bad beam combinations is generated to evaluate the cost of a hub-beam combination.

13. A method according to claim 12, further comprising joint slot assignment, wherein RBMs are shuffled in a slot assignment map to minimize the cost function.

14. A method according to claim 1, wherein using a reserved frame comprises, in a training cycle, transmitting from the respective serving hub, a special downlink (DL) subframe and transmitting from the RBM, a special uplink (UL) subframe to obtain channel gain information for each hub-beam of the serving hub.

15. A method according to claim 14 further comprising, in a measurement cycle, transmitting a hub-beam selection DL subframe from each hub-beam, said subframe comprising a known data burst, enabling the RBM to train an equalizer and decode the known data bursts to obtain a channel estimate for the PL for each hub-beam.

16. A method according to claim 14, wherein in the training cycle, the serving hub sends training symbols, and the RBM measures the received signal strength and computes a beam channel gain, and averages the channel gains over the training period to obtain a long term path loss (PL).

17. A system in a wireless backhaul network comprising a plurality of sites wherein each site comprises a plurality of hub modules having multi-beam antenna, and each hub module serves a plurality of remote backhaul modules (RBMs), said hubs, RBMs and a network server comprising processor means configured for coordinating hub-beam selection by implementing steps comprising:
- obtaining for each of a set of RBMs in at least part of the wireless backhaul network (neighborhood), data indicative of path loss for hub-RBM radio links for each hub-beam of a respective serving hub;
- from the data indicative of path loss computing a performance metric for the hub-RBM radio links for each hub-beam; and
- selecting a hub-beam for each of the set of hub-RBM links that optimizes said performance metric across the set of RBMs of the neighborhood;
- for each RBM of the neighborhood, communicating to its serving hub the respective hub-beam identification; and
- wherein obtaining said data indicative of path loss comprises performing measurements of Radio Frequency Environment Characteristics (RFEC measurements) for at least a subset of RBMs, using reserved frames to train each RBM on each hub-beam of its serving hub and obtaining measured data for estimating the path loss for each hub-beam.

18. A non-transitory computer readable storage medium storing instructions, which, when executed by distributed or centralized processing means of a wireless backhaul network comprising a plurality of sites wherein each site comprises a plurality of hub modules having multi-beam antenna, and each hub module serves a plurality of remote backhaul modules (RBMs), perform steps of coordinating hub-beam selection comprising:
- obtaining for each of a set of RBMs in at least part of the wireless backhaul network (neighborhood), data indicative of path loss for hub-RBM radio links for each hub-beam of a respective serving hub;
- from the data indicative of path loss computing a performance metric for the hub-RBM radio links for each hub-beam; and
- selecting a hub-beam for each of the set of hub-RBM links that optimizes said performance metric across the set of RBMs of the neighborhood;
- for each RBM of the neighborhood, communicating to its serving hub the respective hub-beam identification; and
- wherein obtaining said data indicative of path loss comprises performing measurements of Radio Frequency Environment Characteristics (RFEC measurements) for at least a subset of RBMs, using reserved frames to train each RBM on each hub-beam of its serving hub and obtaining measured data for estimating the path loss for each hub-beam.

* * * * *